United States Patent
Scapens

(10) Patent No.: US 10,501,332 B2
(45) Date of Patent: Dec. 10, 2019

(54) STRUCTURED ZIRCONIUM SOLUTIONS

(71) Applicant: Magnesium Elektron Limited, Manchester (GB)

(72) Inventor: David Alastair Scapens, Manchester (GB)

(73) Assignee: Magnesium Elektron Ltd., Mancehester (GB)

( * ) Notice: Subject to any disclaimer, the term of this patent is extended or adjusted under 35 U.S.C. 154(b) by 0 days.

(21) Appl. No.: 15/770,070

(22) PCT Filed: Oct. 27, 2016

(86) PCT No.: PCT/GB2016/053332
§ 371 (c)(1),
(2) Date: Apr. 20, 2018

(87) PCT Pub. No.: WO2017/072507
PCT Pub. Date: May 4, 2017

(65) Prior Publication Data
US 2018/0319671 A1    Nov. 8, 2018

(30) Foreign Application Priority Data
Oct. 27, 2015 (GB) .................................. 1518996.2

(51) Int. Cl.
| | | |
|---|---|---|
| *C01G 25/02* | (2006.01) | |
| *B01J 13/00* | (2006.01) | |
| *B01J 35/00* | (2006.01) | |
| *B01J 35/02* | (2006.01) | |
| *B01J 37/03* | (2006.01) | |
| *B01J 21/06* | (2006.01) | |
| *B01J 23/10* | (2006.01) | |
| *B01J 37/04* | (2006.01) | |
| *B01J 37/06* | (2006.01) | |
| *B01J 37/08* | (2006.01) | |
| *B01J 35/10* | (2006.01) | |
| *C01F 17/00* | (2006.01) | |
(Continued)

(52) U.S. Cl.
CPC ........... *C01G 25/02* (2013.01); *B01D 53/945* (2013.01); *B01J 13/0021* (2013.01); *B01J 13/0047* (2013.01); *B01J 21/066* (2013.01); *B01J 23/10* (2013.01); *B01J 35/002* (2013.01); *B01J 35/023* (2013.01); *B01J 35/1014* (2013.01); *B01J 35/1038* (2013.01); *B01J 37/03* (2013.01); *B01J 37/031* (2013.01); *B01J 37/036* (2013.01); *B01J 37/04* (2013.01); *B01J 37/06* (2013.01); *B01J 37/08* (2013.01); *B01J 37/10* (2013.01); *C01F 17/00* (2013.01); *C01F 17/0018* (2013.01); *C01G 25/006* (2013.01); *B01D 2255/407* (2013.01); *B01J 2523/00* (2013.01); *C01P 2002/60* (2013.01); *C01P 2006/12* (2013.01); *C01P 2006/13* (2013.01); *C01P 2006/14* (2013.01); *C01P 2006/16* (2013.01); *C01P 2006/17* (2013.01)

(58) Field of Classification Search
CPC ........ C01G 25/02; C01G 25/006; B01J 13/00; B01J 35/00; B01J 37/03; B01J 21/06; B01J 13/0004; B01J 13/0008; B01J 13/0034; B01J 37/00; C01P 2006/12; C01P 2006/13; C01P 2006/14; C01P 2002/60; C01P 2006/22; C01F 17/00
See application file for complete search history.

(56) References Cited

U.S. PATENT DOCUMENTS

| | | |
|---|---|---|
| 3,359,213 A | 12/1967 | Clearfield |
| 3,518,050 A | 6/1970 | Woodhead |
| | (Continued) | |

FOREIGN PATENT DOCUMENTS

| | | |
|---|---|---|
| CN | 101623626 A | 1/2010 |
| CN | 102040379 A | 5/2011 |
| | (Continued) | |

OTHER PUBLICATIONS

International Search Report & Written Opinion for PCT/GB2016/053332 dated Dec. 13, 2016, 12 pages.
(Continued)

*Primary Examiner* — Timothy C Vanoy
(74) *Attorney, Agent, or Firm* — Praedcere Law

(57) ABSTRACT

This invention relates to a zirconium solution or sol comprising: (a) zirconium, (b) nitrate, acetate and/or chloride ions, and (c) one or more complexing agents being an organic compound comprising at least one of the following functional groups: an amine, an organosulphate, a sulphonate, a hydroxyl, an ether or a carboxylic acid group, wherein the molar ratio of components (a):(b) is 1:0.7 to 1:4.0, the molar ratio of components (a):(c) is 1:0.0005 to 1:0.1, and the pH of the zirconium solution or sol is less than 5. The invention also relates to a process for preparing a zirconium solution or sol, the process comprising the steps of: (a) dissolving a zirconium salt in nitric, acetic and/or hydrochloric acid, and (b) adding one or more complexing agents to the resulting solution, the one or more complexing agents being an organic compound comprising at least one of the following functional groups: an amine, an organosulphate, a sulphonate, a hydroxyl, an ether or a carboxylic acid group, and (c) heating the solution or sol to a temperature of at least 75° C. In addition, the invention relates to products formed from the zirconium solution or sol or obtainable by the process.

18 Claims, No Drawings

(51) Int. Cl.
  *B01D 53/94* (2006.01)
  *B01J 37/10* (2006.01)
  *C01G 25/00* (2006.01)

(56) References Cited

U.S. PATENT DOCUMENTS

| | | | |
|---|---|---|---|
| 3,645,910 | A | 2/1972 | Woodhead |
| 3,776,987 | A | 12/1973 | Grimes |
| 4,788,045 | A | 11/1988 | Colombet et al. |
| 5,223,176 | A * | 6/1993 | Obitsu .................. A61K 33/24 |
| | | | 106/286.4 |
| 5,234,870 | A * | 8/1993 | Osaka .................. B01J 13/0021 |
| | | | 423/608 |
| 5,466,846 | A | 11/1995 | Sharif |
| 5,750,459 | A * | 5/1998 | Marella .................. B01J 13/00 |
| | | | 501/12 |
| 6,171,572 | B1 | 1/2001 | Aozasa |
| 6,376,590 | B2 * | 4/2002 | Kolb .................. B01J 13/0008 |
| | | | 106/287.19 |

| | | | |
|---|---|---|---|
| 2003/0069132 | A1 | 4/2003 | Woodhead |
| 2004/0192790 | A1 | 9/2004 | Chiang et al. |
| 2006/0115397 | A1 | 6/2006 | Hedouin |
| 2008/0293831 | A1 * | 11/2008 | Kato .................. B01J 13/0008 |
| | | | 516/90 |

FOREIGN PATENT DOCUMENTS

| | | | |
|---|---|---|---|
| CN | 102464353 A | 5/2012 | |
| CN | 102775143 A | 11/2012 | |
| EP | 0409282 A2 | 1/1991 | |
| EP | 1 994 979 A1 * | 11/2008 | ............. B01J 13/00 |
| GB | 1 181 794 A * | 2/1970 | ............. C01G 25/00 |
| JP | 2003206137 A | 7/2003 | |
| WO | WO2014122140 A2 | 8/2014 | |

OTHER PUBLICATIONS

Search and Examination Report for GB 1518996.2 dated Mar. 7, 2016, 6 pages.

* cited by examiner

STRUCTURED ZIRCONIUM SOLUTIONS

This invention relates to zirconium sols/solutions and processes for preparing zirconium sols/solutions. The invention also relates to the use of the zirconium sols/solutions in the preparation of zirconium mixed metal hydroxides, oxides, phosphates, sulphates or other zirconium species as well as the use of the zirconium sols/solutions as cross-linkers (particularly in oil field and fracturing applications), and as a functional or non-functional binder in coatings or catalysts.

BACKGROUND

In patents GB1181794, U.S. Pat. Nos. 3,518,050 and 3,645,910, and published patent application US20030069132A1, Woodhead describes the formation of a zirconium sol. The processes described in these documents do not include a complexing agent as defined in the present invention and thus they result in insufficient structure generation (polymerisation extent) in the sol for use in subsequent applications. The oxide products referred to in the Woodhead patents are described as very dense, and, for example, would be completely unsuitable for catalytic applications.

U.S. Pat. No. 3,776,987 relates to various metal sols, including a zirconia sol as prepared in U.S. Pat. No. 3,518,050, to which are added an organic polymer (i.e. containing hydroxy, carboxyl and amino groups). However, no heating step takes place in the presence of the organic and it plays no part in controlling the thermal hydrolysis of the Zr-precursor in the sol-forming stage. In addition, the sol has a pH of around 9-10. Similarly, U.S. Pat. No. 5,750,459 uses a zirconium precursor prepared by dissolving zirconium basic carbonate in nitric acid. A thickening agent is then added prior to dripping into an alkaline gelation bath. There is no use of a complexing agent as defined in the present invention.

CN102040379, CN102775143 and CN102464353 all relate to the formation of zirconia colloids/sols. However, none of them disclose the use of a complexing agent as defined in the present invention in the formation of the zirconium sol.

U.S. Pat. No. 4,788,045 mentions the use of a zirconium oxynitrate precursor heated at 150° C./24 hrs. U.S. Pat. No. 3,359,213 discusses the formation of colloidal hydrous oxides of zirconia. US20060115397 mentions the use of a zirconia sol prepared by the dissolution of zirconium basic carbonate in nitric acid. None of these documents mentions the use of a complexing agent as defined in the present invention.

EP1994979A1 refers to the formation of a zirconia sol by dissolution of a zirconium compound (e.g. zirconium basic carbonate) into an aqueous solution of a dicarboxylic acid (e.g. oxalic acid). The final product typically has a very low concentration (~2% $ZrO_2$) and a pH of ~6-7, which is significantly different from the composition of the invention. In addition, the process does not involve the dissolution of a zirconium salt in nitric, acetic or hydrochloric acid.

U.S. Pat. No. 5,466,846 relates to the preparation of aqueous solutions of zirconium chelates (α-hydroxycarboxylic acids) with specific mention of mandelic acid, e.g. sodium zirconium mandelate, potassium zirconium mandelate and amine zirconium mandelate. The [α-hydroxycarboxylate]:Zr ratio is from 0.5:1 to 20:1, so significantly higher than the amount of complexing agent used in the present invention.

U.S. Pat. No. 5,234,870 relates to the formation of zirconia sols by heat treatment (hydrolysis) of ammonium zirconium carbonate in the presence of organic chelating agents (e.g. oxyacids). The use of ammonium zirconium carbonate results in the sol having a pH of >7, which is significantly higher than that of the present invention.

An improved process for preparing zirconium sols/solutions, in which the sol/solution can impart advantageous properties in products formed therefrom, has been sought.

STATEMENT OF INVENTION

According to one aspect of the invention, there is provided a zirconium solution or sol comprising:
(a) zirconium,
(b) nitrate, acetate and/or chloride ions, and
(c) one or more complexing agents being an organic compound comprising at least one of the following functional groups: an amine, an organosulphate, a sulphonate, a hydroxyl, an ether or a carboxylic acid group, wherein the molar ratio of components (a):(b) is 1:0.7 to 1:4.0, the molar ratio of components (a):(c) is 1:0.0005 to 1:0.1, and the pH of the zirconium solution or sol is less than 5.

More particularly, the solution or sol may comprise zirconium in an amount of 5-30% by weight (based on $ZrO_2$ equivalent), even more particularly 10-20% by weight, more particularly 12-16% by weight. The equivalent zirconium content expressed as $ZrO_2$ means that, for example, 100 g of a 15% by weight solution would have the same zirconium content as 15 g of $ZrO_2$.

In particular, the solution or sol may comprise nitrate ions as component (b). Without wishing to be bound to any theory, although other acids may be used it is thought that the nitrate ions provided by nitric acid coordinate particularly well with the zirconium ions in the aqueous solution.

When the solution or sol comprises nitrate ions as component (b), the molar ratio of components (a):(b) is preferably 1:0.8 to 1:2.0. When the solution or sol comprises acetate ions as component (b), the molar ratio of components (a):(b) is preferably 1:1.5 to 1:4.0. When the solution or sol comprises chloride ions as component (b), the molar ratio of components (a):(b) is preferably 1:0.7 to 1:2.2.

More particularly, when the solution or sol comprises nitrate or chloride ions as component (b) the pH of the solution or sol is less than 2, and in some embodiments less than 1. In particular, when the solution or sol comprises acetate ions as component (b) the pH of the solution or sol is less than 5, and in some embodiments less than 4.

In the context of the invention, the term complexing agent is used to mean a ligand that bonds to zirconium. In some embodiments, the complexing agent may be a carboxylic acid, a dicarboxylic acid, an alpha hydroxycarboxylic acid, an amino acid, an organosulphate, a sulphonate or a polyol. In particular, the complexing agent may be a multidentate, more particularly a bidentate, ligand. In some embodiments, the complexing agent may be non-polymeric. The polyol may be a polysaccharide or a carbohydrate, for example starch. In particular, the complexing agent may be an alpha hydroxycarboxylic acid. The complexing agent generally has a polar group (ie an amine, an organosulphate, a sulphonate, a hydroxyl, an ether or a carboxylic acid group) which coordinates to zirconium, and one or more hydrocarbon groups. In some embodiments, the one or more hydrocarbon groups may comprise one or more aromatic substituents, more particularly one or more phenyl substituents.

Without wishing to be bound to any theory, multidentate ligands coordinate effectively to metal ions. The combination of different functional groups within the same molecule may be advantageous to interact with different coordination environments on the metal ion; providing both steric and electronic effects. Thus, depending upon the nature of the pore size and pore network desired in the material which is formed from the zirconium solution or sol, complexing agents with different hydrocarbon groups may be used. For example, the alpha hydroxy carboxylic acid may be an aromatic (for example, phenyl) or non-aromatic alpha hydroxycarboxylic acid, more particularly mandelic or benzillic or lactic acid, even more particularly mandelic acid.

More particularly, the molar ratio of components (a):(c) is 1:0.001 to 1:0.05, even more particularly 1:0.002 to 1:0.02.

In some embodiments, the zirconium solution or sol has a refractive index of at least 1.34. Refractive index was measured at 20° C. using a 589 nm illumination source, zeroed with deionised water. The equipment used was a Bellingham and Stanley RFM970-T refractometer. More particularly, the zirconium solution of sol has a density of at least 1.05 g/cm$^3$. Density was measured by weighing a known volume; 1000 μl Thermo scientific FINNPIPETTE F2 and a 4 decimal place OHAUS Pioneer balance.

The zirconium solution or sol may be "matured" by heat treatment. The solution is heated, normally from room temperature (ie 25° C.), to a temperature in the range 60-100° C., more particularly 80-100° C. The heating rate is normally in the range 0.1-5° C./min, more preferably 0.2-1.5° C./min. The solution or sol is then maintained at the maximum temperature for around 0.5-15 hours, more particularly 1-5 hours, normally about 2 hours. This is known as the dwell time. The solution is then allowed to cool, or is cooled, to room temperature. In an example of the heat treatment, the solution or sol is heated to a temperature of 94° C. at a heating rate of 1° C./min, with a dwell time of 2 hours. In some embodiments, the zirconium solution or sol has a maximum viscosity when heated to a temperature of 94° C. at a heating rate of 1° C./min, with a dwell time of 2 hours, of 3000 cp. Viscosity was measured using a Chandler 5550 viscometer, with a shear rate of 100 s$^{-1}$.

In some embodiments, the conductivity of the zirconium solution or sol is higher after being heated to a temperature of 94° C. at a heating rate of 1° C./min, with a dwell time of 2 hours. More particularly, the conductivity in mS/cm is at least 10% higher after being heated to a temperature of 94° C. at a heating rate of 1° C./min, with a dwell time of 2 hours, even more particularly at least 20% higher. The conductivity of the zirconium solution or sol after being heated to a temperature of 94° C. at a heating rate of 1° C./min, with a dwell time of 2 hours, is generally 10-1000 mS/cm, preferably 25-450 mS/cm. Conductivity was measured using a HANNA H18733 conductivity meter, with temperature correction set to 2. Calibration check was carried out daily using a H170030 standard (12880 μS/cm at 25° C.). The maximum range of the meter used was 200 mS/cm. Thus, for any values over 200 mS/cm the samples were diluted by a factor of three with deionised water and then the results recalculated to allow for this dilution.

In particular, when the solution or sol comprises nitrate ions as component (b), there is an increase in the absorbance (ie intensity) at 361 nm as measured by UV-Vis spectroscopy after the solution is heated to a temperature of 94° C. at a heating rate of 1° C./min, with a dwell time of 2 hours. Preferably, there is an increase in absorbance of a factor of >2.7 (ie absorbance after the specified heating conditions is more than 2.7 times the initial value). UV-Vis analysis was carried out using a Heλiosβ UV-Visible spectrophotometer v4.55.

More particularly, the amount of titratable acid in the zirconium solution or sol after being heated to a temperature of 94° C. at a heating rate of 1° C./min, with a dwell time of 2 hours, may be 4.5-15 mmolH$^+$/gZrO$_2$. The amount of titratable acid was measured using an auto-titrator, TitroLine (SCHOTT Instruments); 1 ml of sample in 800 ml deionised water, titrated up the equivalence point (pH7.0-7.1) using 0.1M NaOH. pH meter calibrated using pH4 and pH7 buffers before each use, and instrument checked using a standard of known free acidity. In some embodiments, the amount of titratable acid in the zirconium solution or sol is lower after being heated to a temperature of 94° C. at a heating rate of 1° C./min, with a dwell time of 2 hours. In particular, when the solution or sol comprises nitrate ions as component (b), the amount of titratable acid in the zirconium solution or sol is lower after being heated to a temperature of 94° C. at a heating rate of 1° C./min, with a dwell time of 2 hours.

According to a further aspect of the invention, there is provided a process for preparing a zirconium solution or sol, the process comprising the steps of:

(a) dissolving a zirconium salt in nitric, acetic and/or hydrochloric acid, and (b) adding one or more complexing agents to the resulting solution, the one or more complexing agents being an organic compound comprising at least one of the following functional groups: an amine, an organosulphate, a sulphonate, a hydroxyl, an ether or a carboxylic acid group, and (c) heating the solution or sol to a temperature of at least 75° C.

In some embodiments, the zirconium salt may be zirconium basic carbonate or zirconium hydroxide. In certain embodiments, zirconium basic carbonate (ZBC) is preferred because it dissolves easily in mineral acids, is commercially available, and the carbonate anions produced are fugitive and so they don't take part or complicate subsequent reactions. Some alternative anions may not be environmentally favourable. In some embodiments, the zirconium salt is dissolved in nitric acid.

The properties of the zirconium solution or sol formed by the process, as well as those of the components of the solution or sol, are preferably as defined above in relation to the zirconium solution or sol itself.

In particular, in step (a) the solution or sol formed may be heated. In particular, the solution or sol may be heated to a temperature above 25° C., more particularly to at least 40° C., even more particularly at least 50° C., more particularly to a temperature in the range 50-70° C. More particularly, the solution or sol may be heated to around 60° C. In some embodiments, heating in step (a) can aid dissolution of the zirconium salt and remove dissolved carbon dioxide from the solution or sol.

In some embodiments, the method may comprise the additional step of increasing the pH of (ie partially neutralising) the solution or sol by adding a base. This additional step may be carried out before, during or after either step (a) or step (b). It can also be carried out during step (c) provided that it is done before the solution or sol reaches a temperature of 60° C. This increase in pH can also be described as a reduction in free acidity. In particular, the pH increase may be carried out prior to heating the solution. Suitable bases include sodium hydroxide, sodium carbonate, sodium hydrogen carbonate, potassium hydroxide, potassium carbonate, potassium hydrogen carbonate, ammonium hydroxide, ammonium carbonate, ammonium hydrogen carbonate and organic amines. In particular, the base may be an inorganic base.

In some embodiments, after step (a) but prior to step (b) the solution may be diluted. This dilution is normally with water, preferably deionised water. More particularly, either with or without the dilution step, the solution or sol may comprise zirconium in an amount of 5-30% by weight (based on $ZrO_2$ equivalent), even more particularly 10-20% by weight, more particularly 12-16% by weight.

In particular, the organic complexing agent in step (b) is as defined above in relation to the zirconium solution or sol.

More particularly, in step (c) the heating may comprise heating the solution or sol to a temperature of at least 80° C., more particularly 90° C. The solution or sol may be maintained at this temperature for 0.5-15 hours. This is known as the dwell time. In particular, the solution or sol may be maintained at this temperature for 1-5 hours, more particularly about 2 hours. More particularly, in step (c) the temperature of the solution may be increased at a rate of 0.1-5° C./min, even more particularly 0.2-1.5° C./min. The solution or sol may then be allowed to cool, or cooled. More particularly, the solution or sol may be allowed to cool, or cooled, to a temperature less than 40° C., even more particularly less than 30° C., more particularly to room temperature.

In some embodiments, the method comprises, after step (c), the step of: (d) adding sulphate ions. This step is carried out in order to form zirconium sulphate, which is generally formed as a precipitate. This material is also known as zirconium (IV) sulphate, zirconium basic sulphate or ZBS. Preferably, the sulphate ions are added to the zirconium solution or sol in an amount such that the molar ratio of sulphate ions to zirconium is 0.1-1.5. Step (d) is normally carried out at a temperature of 98° C. or less. It has been surprisingly found by the inventors that, by using the process of the invention, ZBS can be formed at lower temperatures than is known in the art. Commercial processes to make ZBS usually use high temperatures, up to 98° C. in order to precipitate the ZBS in an industrially acceptable timeframe. In particular, step (d) may be carried out at a temperature of less than 40° C., preferably less than 30° C., more preferably at room temperature (ie after the solution or sol has been allowed to cool, or cooled, as described above). According to a third aspect of the invention, there is provided a zirconium basic sulphate obtainable by the process defined above. According to a fourth aspect of the invention, there is provided a zirconium basic sulphate comprising (a) one or more complexing agents being an organic compound comprising at least one of the following functional groups: an amine, an organosulphate, a sulphonate, a hydroxyl, an ether or a carboxylic acid group, wherein the molar ratio of zirconium:complexing agent is 1:0.0005 to 1:0.1. More particularly, the molar ratio of zirconium:complexing agent is 1:0.001 to 1:0.05, even more particularly 1:0.002 to 1:0.02.

The zirconium solution or sol may be agitated/stirred during one or more of the above steps.

According to a fifth aspect of the invention, there is provided a zirconium solution or sol obtainable by the process defined above.

According to a sixth aspect of the invention, there are provided mixed metal hydroxides and oxides, crosslinkers (particularly in oil field and fracturing applications), and functional or non-functional binders in coatings, formed from the zirconium solution or sol of the invention, or from a zirconium solution or sol obtained by the process of the invention.

When the compositions defined herein, or made by the process defined above, are aged, especially in hydrothermal ageing conditions at high temperatures, we see that the pore volume in the meso porous region can be impressively retained. This effect can have two benefits, one is to retain a pore size that minimizes any gas diffusion limitations in the resulting solid, the second is to retain sufficient volume of pores of an appropriate size such that reduction of catalytic activity by loss of supported metal dispersion is minimised. The lack of change of pore size distribution and pore volume is indicative of the inhibition of solid state sintering processes, which can thus lead to a desirable small change in supported metal dispersion via encapsulation.

The invention will now be described by way of example with reference to the following Examples.

EXAMPLES 1-11

These examples are all a variation on the first example, Example 1. In Example 1, a stock solution was prepared by dissolving zirconium basic carbonate in nitric acid to give a $NO_3$:Zr molar ratio of 0.9:1. This stock solution was heated to 60° C. to complete the dissolution. The concentration of this stock solution (quoted as $ZrO_2$ equivalent on a mass basis) was 26.0%, referred to as "ZHN-1" (ie zirconium hydroxy nitrate).

The required amounts of deionised water, nitric acid, sodium hydroxide, mandelic acid were then added as required for each experiment such that the starting zirconium concentration was 14% ($ZrO_2$ equivalent on a mass basis).

A stock solution of mandelic acid (8.0% by weight) was prepared by dissolving commercially available mandelic acid in deionised water. Unless specified below, mandelic acid ("Mand") was added in an amount of 1.5 mol % (based on zirconium), the heating rate was 1° C./min, the peak temperature was 94° C. and the dwell time at peak temperature was 2 hours.

The experimental conditions for Examples 1-11 are set out in Table 1 below, and the results in Table 2 below. In Table 1 below, "ZOC" refers to zirconium oxychloride. The complexing agent is mandelic acid unless specified otherwise.

In Table 2, "Before" refers to the values measured on the initial solution (ie before heated to and dwelling at peak temperature). "After" refers to the values once this heat treatment has been carried out and cooled to ambient temperature (i.e. room temperature).

TABLE 1

| Example number | $NO_3$:Zr | Na:Zr | Complexing agent (mol %) | Peak Temp. (° C.) | Heat Rate (° C./min) | Dwell (hr) | $ZrO_2$ (%) |
|---|---|---|---|---|---|---|---|
| 1 | 1:1 | 0 | 5 | 94 | 1 | 2 | 14 |
| 2* | 1:1 | 0 | 0 | 94 | 1 | 2 | 14 |
| 3 | ZOC | 0 | 1.5 | 94 | 1 | 2 | 14 |
| 4 | 1.3:1 | 0.3:1 | 0.5 | 94 | 1 | 2 | 14 |
| 5 | 1:1 | 0 | 1.5 | 94 | 1 | 2 | 14 |
| 6 | 1:1 | 0 | 1.5 | 85 | 1 | 2 | 14 |
| 7 | 1:1 | 0 | Starch, 1.5 | 94 | 1 | 2 | 14 |
| 8 | 1:1 | 0 | 0.1 | 94 | 1 | 2 | 14 |
| 9 | 0.8:1 | 0 | 1.5 | 94 | 1 | 2 | 14 |
| 10 | 1:1 | 0 | 1.5 | 94 | 0.25 | 2 | 14 |
| 11 | 2:1 | 0 | 1.5 | 94 | 1 | 2 | 14 |

* = comparative example

Additional detail on the preparation of the solutions for the Examples in Table 1 is given below.

Example 1

65.38 g of ZHN-1 stock solution was mixed with 2.877 g of 30% $HNO_3$, 13.03 g of mandelic acid stock solution and 40.14 g of deionised water. This was stirred for 10 mins. 53 $cm^3$ of this solution was then added to the reaction vessel of a Chandler 5550 Viscometer, pressurised to 500 psi under nitrogen, and with a shear rate of 100 $s^{-1}$ (which remained constant throughout the duration of the experiment).

The temperature was increased from ambient to 60° C. over 15 mins and then dwelled at 60° C. for 10 mins. The temperature was then increased from 60° C. to 94° C. at a rate of 1° C./min followed by a dwell at 94° C. for 2 hrs. Finally, the temperature was reduced to ambient over approximately 20 mins. The in-situ viscosity was recorded during this program.

The resulting sol was removed from the viscometer vessel and characterised by pH, conductivity, refractive index, density, base-titration and UV-Vis measurements. The original solution (i.e. without being subjected to the above temperature program) was characterised equivalently.

Comparative Example 2

65.38 g of ZHN-1 stock solution was mixed with 2.877 g of 30% $HNO_3$ and 53.17 g of deionised water (ie no complexing agent was added). This was stirred for 10 mins. 53 $cm^3$ of this solution was then added to the reaction vessel of a Chandler 5550 Viscometer and then processed in exactly the same way as Example 1.

Example 3

82.13 g of a zirconium oxychloride solution (20.7% $ZrO_2$ equivalent, prepared from commercial crystals) was mixed with 3.909 g of the mandelic acid stock solution and 35.39 g of deionised water (ie no complexing agent was added). This was stirred for 10 mins. 53 $cm^3$ of this solution was then added to the reaction vessel of a Chandler 5550 Viscometer and then processed in exactly the same way as Example 1.

Example 4

65.38 g of ZHN-1 stock solution was mixed with 11.51 g of 30% $HNO_3$, 1.303 g of mandelic acid stock solution, 16.44 g of sodium hydroxide solution (10% by weight) and 26.79 g of deionised water. This was stirred for 10 mins. 53 $cm^3$ of this solution was then added to the reaction vessel of a Chandler 5550 Viscometer and then processed in exactly the same way as Example 1.

Example 5

65.38 g of ZHN-1 stock solution was mixed with 2.877 g of 30% $HNO_3$, 3.909 g of the mandelic acid stock solution and 49.26 g of deionised water. This was stirred for 10 mins. 53 $cm^3$ of this solution was then added to the reaction vessel of a Chandler 5550 Viscometer and then processed in exactly the same way as Example 1.

Example 6

65.38 g of ZHN-1 stock solution was mixed with 2.877 g of 30% $HNO_3$, 3.909 g of mandelic acid stock solution and 49.26 g of deionised water. This was stirred for 10 mins. 53 $cm^3$ of this solution was then added to the reaction vessel of a Chandler 5550 Viscometer and then processed in exactly the same way as Example 1, except that the temperature was increased from 60° C. to 85° C. at a rate of 1° C./min followed by a dwell at 85° C. for 2 hrs.

Example 7

65.38 g of ZHN-1 stock solution was mixed with 2.877 g of 30% $HNO_3$, 0.333 g of soluble starch powder and 52.83 g of deionised water. This was stirred for 10 mins. 53 $cm^3$ of this solution was then added to the reaction vessel of a Chandler 5550Viscometer and then processed in exactly the same way as Example 1.

Example 8

65.38 g of ZHN-1 stock solution was mixed with 2.877 g of 30% $HNO_3$, 0.261 g of mandelic acid stock solution and 52.91 g of deionised water. This was stirred for 10 mins. 53 $cm^3$ of this solution was then added to the reaction vessel of a Chandler 5550 Viscometer and then processed in exactly the same way as Example 1.

Example 9

An analogous solution to the ZHN-1 described above in relation to Examples 1-8 was prepared using the same reagents/conditions but at a $NO_3$:Zr molar ratio of 0.8:1. The concentration (quoted as $ZrO_2$ equivalent on mass basis) was 18.0%. 94.44 g of this solution was mixed with 3.909 g of the mandelic acid stock solution and 23.07 g of deionised water. This was stirred for 10 mins. 53 $cm^3$ of this solution was then added to the reaction vessel of a Chandler 5550 Viscometer and then processed in exactly the same way as Example 1.

Example 10

65.38 g of ZHN-1 stock solution was mixed with 2.877 g of 30% $HNO_3$, 3.909 g of mandelic acid stock solution and 49.26 g of deionised water. This was stirred for 10 mins. 53 $cm^3$ of this solution was then added to the reaction vessel of a Chandler 5550 Viscometer and then processed in exactly the same way as Example 1, except that a ramp rate of 0.25° C./min was applied from 60° C. to 94° C.

Example 11

65.38 g of ZHN-1 stock solution was mixed with 31.65 g of 30% $HNO_3$, 3.909 g of mandelic acid stock solution and 20.49 g of deionised water. This was stirred for 10 mins. 53 $cm^3$ of this solution was then added to the reaction vessel of a Chandler 5550 Viscometer and then processed in exactly the same way as Example 1.

TABLE 2

| Exp. | pH | | Conductivity (ms) | | Density (g/cm³) | | Refractive Index | | Free Acidity (mmolH+/gZrO₂) | | UV-Vis (Abs at 361 nm) | | Peak visc. (cp) |
|---|---|---|---|---|---|---|---|---|---|---|---|---|---|
| No | Before | After | Before | After | Before | After | Before | After | Before | After | Before | After | in-situ |
| 1 | 0.63 | 0.52 | 107 | 158 | 1.20 | 1.20 | 1.37001 | 1.37000 | 7.02 | 6.69 | 0.078 | 1.820 | 610 |
| 2* | 0.60 | 0.52 | 95 | 168 | 1.20 | 1.20 | 1.37020 | 1.37021 | 6.87 | 6.50 | 0.040 | 0.107 | 18 |
| 3 | 0.41 | 0.3 | 203 | 233 | 1.23 | 1.24 | 1.37480 | | 15.81 | 15.98 | | | 1.3 |
| 4 | 0.96 | 0.88 | 117 | 176 | 1.23 | 1.23 | 1.37064 | 1.37444 | 6.74 | 6.28 | 0.050 | 0.33 | 2300 |
| 5 | 0.99 | 0.91 | 97 | 162 | 1.20 | 1.20 | 1.37008 | 1.37066 | 6.98 | 6.64 | 0.056 | 0.336 | 21 |
| 6 | 0.87 | 0.78 | 99 | 150 | 1.20 | 1.19 | 1.37444 | 1.37049 | 6.90 | 6.59 | 0.045 | 0.176 | 2.5 |
| 7 | 0.65 | 0.53 | 96 | 154 | 1.20 | 1.19 | 1.37066 | 1.37037 | 6.12 | 5.75 | 0.030 | 0.187 | 6.4 |
| 8 | 0.41 | 0.3 | 92 | 154 | 1.20 | 1.20 | 1.37078 | 1.37015 | 6.70 | 6.26 | 0.036 | 0.109 | 2.7 |
| 9 | 0.9 | 0.54 | 35 | 82 | 1.19 | 1.19 | 1.37924 | 1.36825 | 5.25 | 4.91 | 0.060 | 0.176 | 1600 |
| 10 | 0.33 | 0.21 | 99 | 159 | 1.21 | 1.20 | 1.37138 | 1.37087 | 6.73 | 6.33 | 0.056 | 0.576 | 3.2 |
| 11 | <0 | <0 | 366 | 410 | 1.26 | 1.26 | 1.37445 | 1.38354 | 15.50 | 14.55 | 0.107 | 2.694 | 0.91 |

\* = comparative example

The invention claimed is:

1. A zirconium solution or sol comprising:
   (a) zirconium,
   (b) nitrate, acetate and/or chloride ions, and
   (c) one or more complexing agents being an organic compound comprising at least one of the following functional groups: an amine, an organosulfate, a sulfonate, a hydroxyl, a dicarboxylic acid or an alpha hydroxycarboxylic acid,
   wherein the molar ratio of components (a):(b) is 1:0.7 to 1:4.0, the molar ratio of components (a):(c) is 1:0.0005 to 1:0.1, and the pH of the zirconium solution or sol is less than 5.

2. A zirconium solution or sol as claimed in claim 1 wherein when the solution or sol comprises nitrate ions as component (b), the molar ratio of components (a):(b) is 1:0.8 to 1:2.0; when the solution or sol comprises acetate ions as component (b), the molar ratio of components (a):(b) is 1:1.5 to 1:4.0; and when the solution or sol comprises chloride ions as component (b), the molar ratio of components (a):(b) is 1:0.7 to 1:2.2.

3. A zirconium solution or sol as claimed in claim 1, comprising nitrate ions as component (b).

4. A zirconium solution or sol as claimed in claim 3, wherein there is an increase in size of the absorbance peak at 361 nm as measured by UV-Vis spectroscopy by a factor of 2.7 after the solution is heated to a temperature of 94° C. at a heating rate of 1° C./min, with a dwell time of 2 hours.

5. A zirconium solution or sol as claimed in claim 1 having a refractive index of at least 1.34.

6. A zirconium solution or sol as claimed in claim 1, wherein the conductivity in mS/cm is at least 10% higher after being heated to a temperature of 94° C. at a heating rate of 1° C./min, with a dwell time of 2 hours.

7. A zirconium solution or sol as claimed in claim 1, wherein component (a) is zirconium basic sulfate.

8. A zirconium solution or sol as claimed in claim 1, wherein the solution or sol comprises zirconium in an amount of 5-30% by weight based on ZrO₂ equivalent.

9. A process for preparing a zirconium solution or sol, the process comprising the steps of:
   (a) dissolving a zirconium salt in nitric, acetic and/or hydrochloric acid, and
   (b) adding one or more complexing agents to the resulting solution, the one or more complexing agents being an organic compound comprising at least one of the following functional groups: an amine, an organosulfate, a sulfonate, a hydroxyl, a dicarboxylic acid or an alpha hydroxycarboxylic acid, and
   (c) heating the solution or sol to a temperature of at least 75° C.

10. A process as claimed in claim 9, wherein the zirconium salt is zirconium basic carbonate.

11. A process as claimed in claim 9, wherein in step (a) the solution or sol is heated to a temperature of at least 40° C.

12. A process as claimed in claim 9, wherein the method comprises the step of increasing the pH of the solution or sol by adding a base.

13. A process as claimed in claim 9, wherein in step (c) the heating comprises heating the solution or sol to a temperature of at least 80° C.

14. A process as claimed in claim 9, wherein in step (c) the solution is maintained at that temperature for 1-5 hours.

15. A process as claimed in claim 9 comprising, after step (c), the step of:
   (d) adding sulfate ions.

16. A process as claimed in claim 9, wherein the solution or sol comprises zirconium in an amount of 5-30% by weight based on ZrO₂ equivalent.

17. A mixed metal hydroxide, mixed metal oxide, cross-linker, or functional or non-functional binder, formed from a zirconium solution or sol as claimed in claim 1.

18. A zirconium basic sulfate obtainable by the process of claim 15.

\* \* \* \* \*